United States Patent [19]

Sawyer

[11] 4,158,629
[45] Jun. 19, 1979

[54] DYNAMIC SELF-CLEANING FILTER FOR LIQUIDS

[75] Inventor: Harold T. Sawyer, Pacific Palisades, Calif.

[73] Assignee: Vernon D. Beehler, Los Angeles, Calif. ; a part interest

[21] Appl. No.: 812,569

[22] Filed: Jul. 5, 1977

Related U.S. Application Data

[63] Continuation-in-part of Ser. No. 496,396, Aug. 12, 1974, abandoned, Ser. No. 573,043, Apr. 30, 1975, abandoned, Ser. No. 633,818, Nov. 20, 1975, abandoned, and Ser. No. 716,529, Aug. 23, 1976, abandoned.

[51] Int. Cl.² ............................................. B01O 29/36
[52] U.S. Cl. ................................ 210/137; 210/321 R; 210/414; 210/433 M; 210/DIG. 18; 210/DIG. 22
[58] Field of Search ...................... 210/19, 23 H, 23 F, 210/433 M, 137, 321 R, DIG. 18, DIG. 22, 249, 332, 384, 388, 391, 397, 413, 414, 422, 541

[56] References Cited

U.S. PATENT DOCUMENTS

| 1,825,631 | 9/1931 | Horvath | 210/137 |
| 2,724,508 | 11/1955 | Luther | 210/19 |
| 2,829,735 | 4/1958 | Keoll | 210/DIG. 18 |
| 2,963,158 | 12/1960 | Jung | 210/19 |
| 3,002,915 | 10/1961 | Royder | 210/433 M |
| 3,417,870 | 12/1968 | Bray | 210/321 R |
| 3,463,321 | 8/1969 | Van Ingen | 210/DIG. 22 |
| 3,617,543 | 11/1971 | Smith | 210/19 |
| 3,710,946 | 1/1973 | Sawyer | 210/433 M |
| 3,739,417 | 6/1973 | Sawyer | 15/92 |
| 3,883,434 | 5/1975 | Gaylek | 210/433 M |
| 3,922,220 | 11/1975 | Middleman | 210/23 H |
| 3,957,637 | 5/1976 | Morey | 210/137 |
| 4,042,503 | 8/1977 | Justus | 210/137 |
| 4,060,483 | 11/1977 | Barzuza | 210/414 |

Primary Examiner—Charles N. Hart
Assistant Examiner—Ernest G. Therkorn
Attorney, Agent, or Firm—Beehler, Mockabee, Arant and Jagger

[57] ABSTRACT

A continuous self-cleaning filter for liquids has an outer resonant tube concentrically mounted around an inner composite tube in spaced relationship providing an annular chamber between them. There is an inflow at one end of the annular chamber for the liquid and an outflow at the other end for residual concentrate. The inner composite tube has an outlet at one end for clear effluent and a closed opposite end. A relatively thin walled perforate liner enveloped in a filter blanket comprises the composite tube. For constantly cleaning the filter blanket a sonic sinusoidal wave inducing transducer is affixed to the exterior wall of the outer resonant tube at an antinodal point, thereby to excite the outer tube into a state of resonance, thereby to continuously transform the liquid to be filtered within the annular chamber into a state of intense vaporous cavitation energy thereby to implode the surfaces of the filter blanket material causing the contamination and build up residue to be continuously removed and returned to concentrate flow within the annular chamber.

13 Claims, 7 Drawing Figures

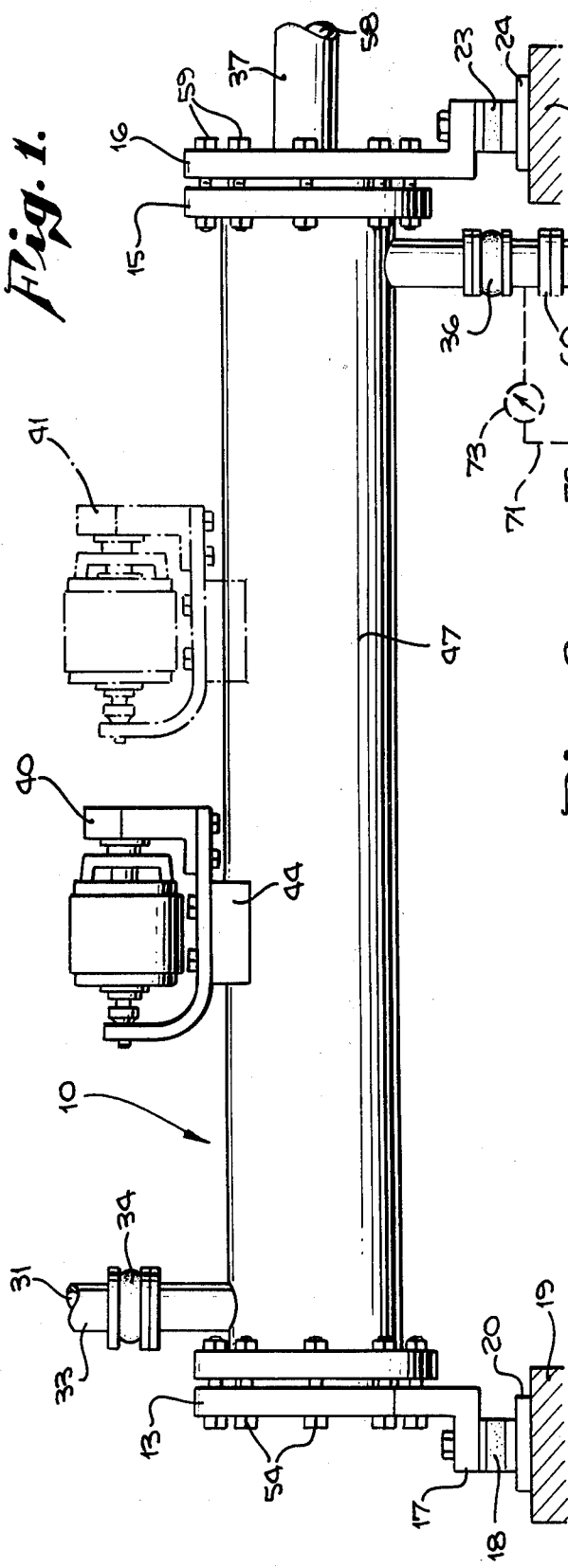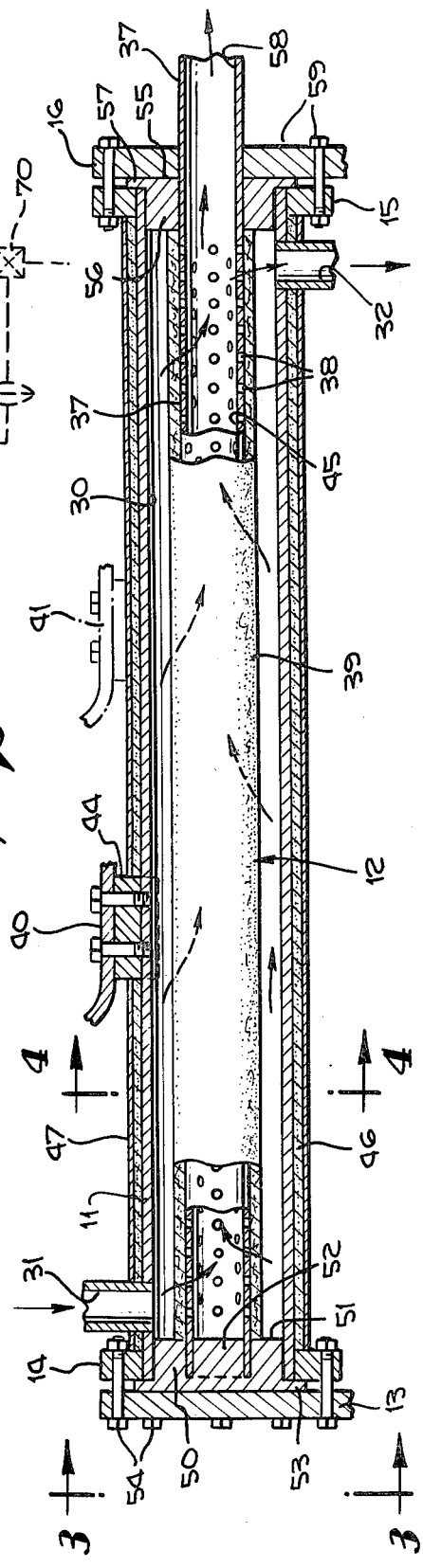

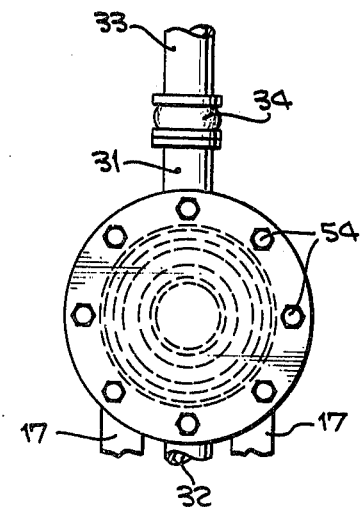
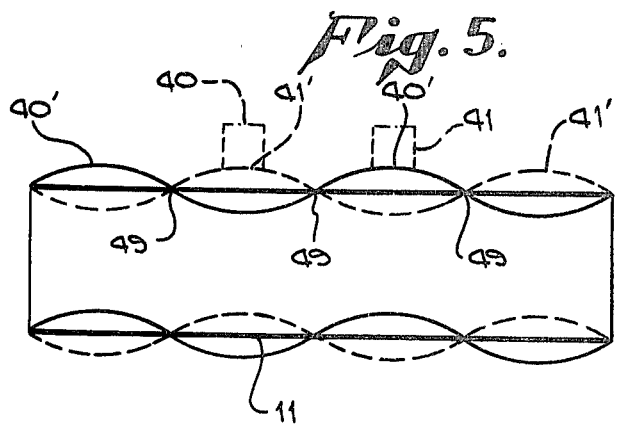
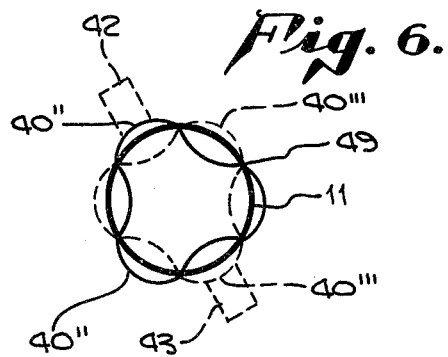
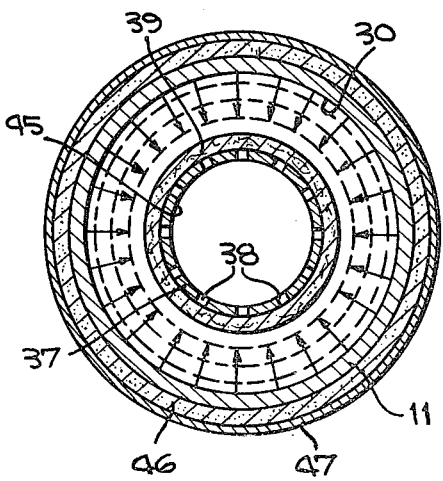
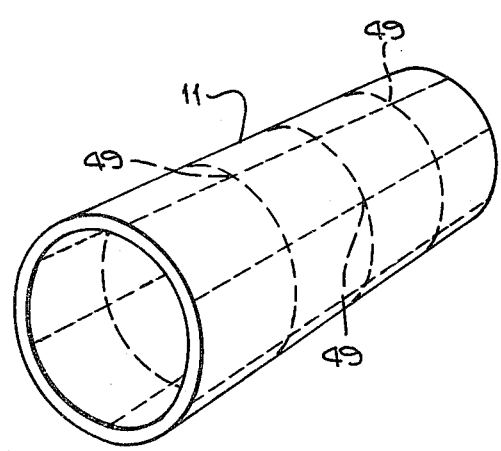

DYNAMIC SELF-CLEANING FILTER FOR LIQUIDS

This is a continuation-in-part of application Ser. No. 496,396 filed Aug. 12, 1974; Ser. No. 573,043 filed Apr. 30, 1975, Ser. No. 633,818 filed Nov. 20, 1975 and Ser. No. 716,529 filed Aug. 23, 1976 all now abandoned.

New environmental standards limiting the volume and type of effluent discharged from a plant or process are having serious repercussions for the products finishing industry. As a result, and during approximately the last five years, separation technology has experienced increased commercial use in such industrial applications as, for example, electrocoating separation of oil emulsions, purification, product separation and recovery, concentration, chemical processing, and production of fresh water from sea water. In addition to minimizing pollution in a major way, separation technology thus employed does in turn produce considerable savings in plant operations by returning fresh water to the process system and providing a high percentage of product recovery approximately 90 percent in some cases.

Although there are many variations in commercial equipment, this invention is specifically related to the membrane process of filtration.

The membrane processes namely, reverse osmosis and ultrafiltration, offer the most significant advances yet achieved, in separation technology for liquid treatment. Membrane processes in combination with conventional processes make possible greater efficiency in the purification of liquid streams not considered heretofore practical to treat.

The basic difference in reverse osmosis filtration and ultrafiltration is in the membrane itself. Although for both reverse osmosis and ultrafiltration semipermeable membrane materials are available commercially in many configurations, this invention relates to a new and novel tubular construction pertinent to the device whereby either reverse osmosis or ultrafiltration commercially membrane materials are wrapped around a stainless steel thin walled supporting tube which has openings throughout its length permitting passage of the filtrate flow.

Reverse osmosis membranes have pores which are generally smaller than those used for ultrafiltration and are in the micron size thus permitting their use for processes which for example, filter salt out of ocean water. Reverse osmosis semipermeable membranes are available in several materials such as, for example, cellulose acetate and fine hollow fibers.

Both reverse osmosis and ultrafiltration are low pressure processes which permit selective molecular separation of liquids. Reverse osmosis membranes are used for dissolved solids and ultrafiltration membranes are used for suspended solids.

Ultrafiltration membranes generally consist of a porous tube or hollow fibers through which the waste stream passes when it is to be cleaned. Membranes with different pore sizes are available for separating the different sizes and concentrations of contaminants in various liquids. Ultrafiltration has certain advantages such as its ability to separate certain liquids from other liquids, such as oil from water solutions.

The major problem that has confronted the industry involved in reverse osmosis and ultrafiltration has been the fouling factor of the membranes themselves. Membranes and porous tubes are prone to fouling by contamination since pores are generally of micron size and many of the liquids tend to impinge upon and penetrate the porous openings of the membrane.

In conventional filtration processes filter cake builds up rapidly and the process must be frequently shut down for filter cleaning or replacement. Depending on the application, the process filter can operate only for days or a week generally before clean-outs are needed. Of the several methods commonly used to clean the filter elements during a downtime period, one is to use cleaning fluid or acid and to back flush and recirculate the fluid through the filter elements by utilizing special valving, piping, tanks, etc. This procedure is time consuming and expensive and usually only partially cleans the filter elements.

The best and most common way of cleaning is to remove the filter elements for either cleaning or replacement.

One of the common preventative methods to preclude buildup of filter cake is to increase the rate of flow, during operation, across the membranes filter element, to continuously wash away a portion of the filter cake. This approach however reduces the filtering efficiency considerably and the filter elements must still be cleaned within days or weeks.

Continuous fouling of the membranes reduces the operating efficiency, lowers the output capacity, adds appreciably to the plant operating costs and reduces plant output by repeated downtimes.

It is therefore among the objects of invention to provide a new improved continuous self-cleaning filter. Another object of the invention is to provide a new and improved filter capable to operating at a rated capacity for long periods of time. Another object of the invention is to provide a new and improved filter which has low maintenance cost. Still another object is to provide a new and improved filter which will reduce the normally required downtime of the filter. Still further among the objects of the invention is to provide a filter which in terms of output capacity over long periods of time is low in cost and which has high capacity and low operating cost. Also included among the objects of the invention is to provide a new and improved filter which utilizes a cylindrical and longitudinal membrane shell design for maximum surface area and strength, which operates at low power and which is self-cleaning without addition of acid solutions or other cleaning agents.

With these and other objects in view the invention consists of the construction, arrangement, and combination of the various parts of the device, whereby the objects contemplated are attained, as hereinafter set forth, pointed out in the appended claims and illustrated in the accompanying drawings.

FIG. 1 is a side elevational view of the device;

FIG. 2 is a longitudinal sectional view similar to FIG. 1 showing the interior structure;

FIG. 3 is an end elevational view on line 3—3 of FIG. 2;

FIG. 4 is a cross-sectional view on line 4—4 of FIG. 2;

FIG. 5 is a schematic view showing the pattern of longitudinal sound wave pattern which defines nodes and antinodes;

FIG. 6 is a schematic drawing showing certain circumferential sound wave patterns which define nodes and antinodes;

FIG. 7 is a perspective view of the exterior resonant shell or tube showing the pattern for both longitudinal and circumferential sound wave patterns.

In an embodiment of the invention chosen for the purpose of illustration there is shown a continuous self-cleaning filter device indicated generally by the reference character 10 shown set up and ready for operation. The device of FIG. 1 and consists, as shown in FIG. 2 for example, primarily of an elongated outer tube or shell 11 concentrically disposed with respect to an elongated cylindrical composite inner tube 12, the tubes being retained at the left end by headers 13 and 14 and at the right end by headers 15 and 16. On the header 13 is a foot piece 17 resting on an isolation pad 18 which in turn is carried on a supporting foundation 19 by suitable plates 20. Similarly at the righthand end there is a foot piece 21 for the header 16 carried by the supporting foundation 22 where it rests upon an isolation pad 23 and plates 24.

The outer tube 11 is spaced from the composite tube 12 for the purpose of providing an elongated annular chamber. There is an inlet passageway 31 adjacent one end of the chamber and an outlet passageway 32 adjacent the opposite end. An inflow pipe 33 adapted to supply the passageway at 31 may be separated from the passageway at 31 by an appropriate flexible nipple 34. Similarly, an outlet pipe 35 may be connected to the outlet passageway 32 by employment of a flexible nipple 36.

The outer tube or shell 11 previously identified is of metallic material which in practice may be stainless steel or other metal suited to the particular filter process. The tube 11 must have a cylindrical shape and sufficient thickness to be self-supporting. It is especially important that it be of material capable of resonance throughout its entire circumference and length. For metal materials such as those made reference to, the resonance is capable of calculation and the tube can accordingly be designed for its job. The composite inner tube consists of an elongated cylindrical liner 37 which is relatively rigid and which additionally is provided with a multiplicity of relatively large perforations 38. In practice, the liner 37 can be relatively thinner than the outer tube 11, and concentric with respect to the outer tube.

Surrounding the liner 37 is a blanket or filter pad 39 substantially thicker than the liner, the thickness depending upon the type of filtering to be accomplished and the particular composition of the blanket.

On the exterior of the outer tube 11 there is affixed a sonic sinusoidal wave energy inducing generator, such, for example, as a transducer 40. It is of some moment that the transducer be mounted on the outer tube 11 at one of the wave length antinodal points 40', 41'. Nodal points are shown at 49 in FIGS. 5 and 6. In the embodiment of FIG. 1, only a single transducer is shown. It is contemplated, however, that there may readily be a plurality of such transducers each in turn being mounted at a wave length antinodal point as suggested by the broken line 41 of FIG. 1. Additionally, transducers may be mounted circumferentially when preferred at, for example, locations 42 and 43 of FIG. 6, these being also at circumferentially disposed wave length antinodal points 40'', 40'''. The number and distribution of such transducers is somewhat optional depending on results required and particular conditions existing in the self-cleaning filter device. The objective however in all instances is to set up a resonant condition in the outer tube 11 so that cavitation energy condition can be imparted to the liquid which flows through the annular chamber 30 and in particular such that cavitation energy can be imparted to the outer surface of the blanket 39, and the liquid which saturates it.

For suitably sealing as well as mounting the outer and inner tubes in concentric spaced relationship there is shown at the left end as viewed in FIG. 2 a mounting seal 50 on which is an integral annular spacer boss 51 and a central spacer boss 52. An annular flange 53 is clamped between the headers 13 and 14 by employment of bolts 54. In order to have the seal 50 serve effectively the surfaces may be painted with a seal material or a gasket material (not shown) may be provided.

At the righthand end as viewed in FIG. 2, a seal 55 is of slightly different construction in that it is provided only with an annular boss 56 and an annular flange 57. For the righthand end there is provided a discharge passage 58 for the filtrate resulting from the process.

As at the opposite end the flange 57 is clamped between the headers 15 and 16 by appropriate bolts 59. Over the outer tube 11 is a soundproof pad 46 held in place by a sheet metal jacket 47.

In this form of the device there is provided a restricted orifice member 60 in the outlet passageway 32. The restricted orifice member is a substantially conventional piece of hardware, details of which have been omitted but which in any event is present to restrict flow through the outlet passageway so that there is a pressure differential between pressure present in the liquid to be filtered which enters through the inlet passageway and the residual liquid which flows through the outlet passageway so that the pressure differential thus created urges a portion of the liquid through the filter blanket of the inner composite tube 12 flowing from there through the perforations 38 into the interior of the liner where it becomes the purified filtrate ultimately passed through the discharge passage 58. In this way the annular passage 30 is kept full.

As an alternative, there may be provided in place of the restricted orifice 60 a pressure control valve 70 in a bypass line 71 subject to control by a pressure regulator 72 in the bypass line. A pressure gage 73 is employed to indicate the pressure present in the passageway 32.

Although transducers have been shown by way of example for setting up a resonant condition in the attendant structure other sinusoidal wave energy inducing generators such for example as ultrasonic generators may be found usable on occasions.

In a device 10 of the kind described there may for example be a low pressure liquid feed flow generally at approximately 100 PSI flowing through the inlet passageway 31 and through the wall of the resonant cylindrical outer tube or shell to the annular chamber 30 where it is to be filtered. The liquid feed flow passes horizontally through the chamber 30 during which time it is filtered in part through the blanket 39 which is a tubular semipermeable filtration membrane or a tubular reserve osmosis membrane. The filtrate thus derived flows into the central chamber 45, said filtered liquid flow being commonly known as a filtrate or filtrate flow.

The continuous filtrate flow, at relatively low pressure flows through the discharge passage 58 in a purified and filtered condition. The filtrate thus may be discharged and either used commercially, or reclaimed and returned to the main process system.

The remaining continuous feed flow passing through chamber 30 is generally known as a continuous concentrate flow and leaves the chamber 30 through the outlet pipe 35 whereby the concentrate is transported and reclaimed in some other process for further use or disposal as the case may be. The recovery of concentrate materials in an efficient filtrate system may reach a value of approximately 90 percent. The flow restricting orifice member 60 is used as a means to restrict and provide substantially a constant concentrate flow, providing of course that the inlet pressure is maintained constant composite. The semipermeable tube 12 may include a blanket of porous tubular cylindrical ceramic or metallic material or material of another construction consisting of cellulose acetate or semipermeable hollow fiber plastic membrane material that is commercially available, and which in turn is wrapped about and secured to the outer surface and throughout the length of a thin stainless steel or plastic liner 37. The semipermeable hollow fiber membrane material may be furnished either for reverse osmosis or for ultrafiltration as may be required.

The longitudinal construction of the membrane tubular material with its supporting tube provides an exceptionally large semipermeable outer surface area which not only reduces the pressure drop through the tubular filter for a specific flow rate, but also tends to reduce the filter cake build up on the filter surface and provides a greater output capacity.

Gradual fouling of the filter membrane by build up of filter cake occurs continuously in conventional process filters requiring constant and expensive periodical cleaning scheduling resulting in costly downtimes.

It is therefore significant in this invention that a novel means of continuous self-cleaning of filter membranes or porous tubes be incorporated in the design of the filter structure to accomplish this end.

The structure herein disclosed is based on certain principles of physics and fluid mechanics, and provides a means of generating a field of vaporous acoustical cavitation within a flowing concentrate fluid solution accommodated by a chamber 30 which is formed by the inner surface of a resonant outer tube 11 and the outer surface of a semipermeable membrane tubular filter or porous tube filter blanket 39.

FIG. 1 shows the sinusoidal frequency generator 40 mounted at a preferred location on the resonant cylindrical outer tube 11 by means of a mounting pad 44 which is in turn brazed to the outer surface of outer tube 11. An acceptable frequency generator 40 is shown in patent application Ser. No. 573,043, filed Apr. 30, 1975, and consists of a mass identified as an induction motor which is driven about its eccentric axis, its supporting motor shaft and its supporting line of center. The oscillating motor mass, in this case, is driven in a conical fashion about eccentric bearing at one end of its supporting frame by means of the shaft of induction motor generally at a speed of 3450 RPM. The induction motor housing is anchored at the opposite end of its supporting frame by means of a semi-rigid resilient mount. The other end of the motor mass consisting of a motor shaft is mounted on an eccentric end bearing which is secured to the supporting frame, through which the shaft turns, causing the motor mass to oscillate about its own axis. This in turn causes a sinusoidal force to be generated and transmitted to the cylindrical outer tube, the exciting frequency of which is the speed of the motor. The exciting sinusoidal force motion produces a sinusoidal longitudinal elastic wave motion and a circumferential elastic wave motion in the outer tube 11.

The purpose of the longitudinal resonant outer tube 11 is to provide a simple structural means of generating and transmitting acoustical elastic wave energy approaching resonance throughout the extremities of the resonant outer tube 11. The cylindrical tube structure may be so designed that it can be excited into one of its chosen modes of natural or resonant frequencies as illustrated in FIGS. 5, 6, and 7. In this case the requirements are usually the 4th or 5th mode of resonant frequency of approximately 180 to 1,000 cycles per second. The design of such a resonant structure and the dynamics of structural response are well-known in the art.

The structure of the invention with transducers rigidly attached to the resonant tube 11 is such that the entire tube serves as the common diaphragm of all the transducers. This means that the entire length and circumference of the tube is in resonance when in operation. As a consequence, sound wave energy is generated in a smooth sinusoidal pattern over the entire surface of the tube and is driven radially inwardly through the entire length and circumference of the annular chamber 30. This is in sharp contrast to indiscriminate vibration or random hammering which is devoid of a sinusoidal wave pattern, and incapable of creating a condition of resonance.

The cavitation condition in the liquid, produced as a result of resonance, extends continuously throughout the liquid and also the filter pad as long as it is saturated with the liquid. Therefore, solids which would otherwise accumulate as filter pack are prevented from accumulating in the filter pad and are constantly being washed away.

The longitudinal and circumferential elastic wave sinusoidal energy released at resonance and shown in FIGS. 5 and 6 is transmitted in perpendicular fashion from the inner surface of the outer resonant tube 11 in the form of acoustical compressional sound waves through the flowing concentrate liquid in chamber 30 as shown in FIG. 2. The velocity of the transmitted compressional wave energy within the unpure liquid concentrate is estimated to be 5,500 feet per second. The shearing forces of the sinusoidal compressional wave energy traveling through the liquid concentrate causes an intense degree of kinetic energy reaction to take place within the fluid concentrate which in turn fractures and ruptures the fluid solution and transforms the energy released within the chamber 30 into another known form of energy namely vaporous cavitation which is a commonly accepted term for such a condition. The cavitation thus developed can be produced at relatively low power.

The phenomenon of cavitation and its physical sonic energy characteristics represents an energy source that is commercially applied to intense cleaning of materials within a liquid medium. In this invention the materials referred to are the semipermeable membranes or other porous filter tube materials that are in contact with the concentrate liquid medium which is in a state of cavitation.

Cavitation energy serves to break down the molecular force or interface, commonly known as surface tension, that exists between the contamination or filter cake material and the filter membranes themselves. Once the molecular attraction of the contamination particles to the filter membrane material is broken, the surface contamination build up is loosened and washed away by the concentrate flow and the membrane filter surfaces are then further imploded and continuously cleaned thus preventing further build up of contamination on the filter membrane material.

Other energy transformation that exist in a field of cavitation that also contributes to the continuous process of the filter material are the forces created by agitation and dispersion energy. The cleaning of the microscopic membrane filter material by cavitation is also aided by means of the great pressure differentials that are set up by the implosion of micron size occuring at a rate of $10^{-9}$ of a second in the microscopic pores of the membrane material and by the heat that is dissipated at the moment of implosion. The cavities or voids that occur during these implosions create a very intense vacuuming action on the surfaces of and within the membrane material and are instantaneously filled with new liquid that surrounds the surfaces and is driven by very high transitory pressure.

The resulting pressures generated at the loci of these implosions have been measured up to 15,000 pounds per square inch. Furthermore, the heat dissipated at the moment of implosion has been determined to be in excess of 1000 degrees C.

Direct mechanical agitation and dispersion created by the alternating sinusoidal compressional sound waves transmitted by the resonant outer tube 11 also assist in the cleaning action taking place at the filter membrane surfaces and to also disperse the removed contamination into the liquid concentrate of the annular chamber 30.

One of the unique advantages of utilizing the principles of cavitation in this instance is that it can be generated anywhere that a compressional sound wave of sufficient intensity can penetrate, and cleaning will occur deep within the interstices of the membrane material which has complicated geometric configuration. Membrane surfaces are seemingly quite smooth to the naked eye, have microscopic pores, hollow tube configurations, cracks and grain boundaries. The specific action of cavitation and its resultant forces, penetrates these minute areas with very intense transitory energy and results in implosions within the membrane material at the microscopic level which can be equaled by no other known method in a cleaning process.

Cleaning takes place in dynamic "in situ" fashion and does not require the addition of acid solvent solutions or other cleaning agents.

Resilient elastomeric insolation pads 18 and 23 are shown which isolate substantially the energy from leaving the filter structure.

Having described the invention, what is claimed as new in support of Letters Patent is as follows:

1. A continuous self-cleaning filter device for liquids comprising an elongated cylindrical outer tube having a wall of integral homogeneous resonant material, a non-resonant support for the tube at each end at respective wave length nodal points, said tube being free of support between said ends, a composite cylindrical inner tube of diameter smaller than said outer tube and concentric with respect to said outer tube forming an elongated annular chamber therebetween, a sealing support structure at each end of said chamber holding the respective ends of the tubes in spaced concentric relationship and holding said tubes intermediate said ends out of engagement with each other, an inlet passageway adjacent one end of said annular chamber for liquid to be filtered, an outlet passageway adjacent the other end of the chamber for discharge of fluid residue and a liquid pressure restricted control means in said outlet passageway productive of a condition wherein said annular chamber and said tubes are substantially continuously filled with liquid, said composite tube comprising a relatively thin-walled inner cylindrical liner having a perforated wall structure with inner and outer relatively hard surfaces, and a blanket of filter material over the outer surface of said wall structure pervious to the passage of liquid filtrate and impervious to the passage of filter pack solid material, there being a substantially clear central chamber in said liner with an opening at one end for collection and discharge of clear filtrate, and a continuously operating sinusoidal frequency energy inducing transducer having a fixed attachment to the wall of the outer tube on the exterior at a sonic wave length antinodal point relative to the ends of the outer tube, said outer tube in response to action of said transducer being continuously in resonance throughout its length and circumference in a sinusoidal wave pattern, said outer tube and the liquid in said annular chamber and in said blanket of filter material being in a resonant condition productive of a condition of continuous cavitation in the liquid in the chamber and the liquid in the blanket of filter material whereby to continuously dislodge residue from the blanket.

2. A continuous self-cleaning filter device as in claim 1 wherein said outer tube of resonant material is a metallic single tube of uniform thickness throughout the length and circumference and relatively thicker than the inner liner and adapted to resonate throughout its length and circumference and wherein the path of travel of energy from the outer tube is radially inward throughout said annular chamber.

3. A continuous self-cleaning filter device as in claim 1 wherein said liner is a relatively thin sheet metal cylinder with relatively large perforations throughout the length and circumference.

4. A continuous self-cleaning filter device as in claim 3 wherein said blanket is relatively thicker than said liner and of material pervious to the filtrated product liquid and impervious to the solid residue.

5. A continuous self-cleaning filter device as in claim 1 wherein the end of the central chamber in said liner opposite the opening is closed.

6. A continuous self-cleaning filter device as in claim 1 wherein there is a plurality of energy inducing transducers at respective wave length antinodal points relative to ends of said outer tube and on the exterior of said outer tube.

7. A continuous self-cleaning filter device as in claim 6 wherein the energy inducing transducers are spaced both axially and circumferentially about said outer tube.

8. A continuous self-cleaning filter device as in claim 1 wherein there is an isolation medium between said filter device and a supporting surface and between opposite ends of said outlet passageway.

9. A continuous self-cleaning filter device as in claim 1 wherein the energy inducing transducer is ultrasonic in character.

10. A continuous self-cleaning filter device as in claim 1 wherein said liquid pressure restricted control means is a constantly open orifice.

11. A continuous self-cleaning filter device as in claim 1 wherein said liquid pressure restricted control means is an adjustable valve device and an automatic pressure regulator operatively connected to said adjustable valve device.

12. A continuous self-cleaning filter device as in claim 1 wherein the inner cylindrical liner is of substantially integral homogeneous resonant material.

13. A continuous self-cleaning filter device as in claim 1 wherein the cylindrical outer tube has a sound resistant cover extending throughout the length and circumference and the said fixed attachment of the transducer extends through said cover.

* * * * *